United States Patent Office 3,536,779
Patented Oct. 27, 1970

3,536,779
METHOD FOR IMPARTING A DURABLE WATER RESISTANT COATING TO A SUBSTRATE
Melik Bedikian, Westwood, N.J., and George R. Decnyf, Jr., deceased, late of East Paterson, N.J., by Louise C. Decnyf, administratrix, East Paterson, N.J., assignors to Nu-Dyne & Finishing Co., Inc., Paterson, N.J., a corporation of New Jersey
No Drawing. Filed May 16, 1967, Ser. No. 638,999
Int. Cl. C08f 35/02, 11/04; C08g 47/10
U.S. Cl. 260—827                             13 Claims

ABSTRACT OF THE DISCLOSURE

This invention concerns an improved method of coating flexible and rigid substrates and compositions adapted for use therein to produce water resistant durable, solvent resistant coatings on substrates which are repeatedly subjected to cleansing treatments such as dry cleaning with harsh solvents in the case of textile materials or washing or cleansing with detergents or solvents in the case of wood, rubber, metallic foil, glass fibers or the like.

The method which constitutes the invention comprises applying to the surface of a selected substrate a coating composition prepared by (a) admixing any cross-linkable acrylic ester polymer such as the reaction product of a glycidyl methacrylate monomer and a lower alkyl acrylate monomer and partially curing the same; (b) separately dissolving a silicone prepolymer with pendant hydroxyl and hydrogen groups into any silane with carbon functional groups such as a vinylalkoxysilane or epoxysilane monomer and reacting the same; (c) combining the silicone prepolymer—vinylalkoxysilane monomer reaction product of (b) with the partially polymerized acrylic copolymer (a); and (d) applying this resinous composite material as a coating to a substrate and curing the same to a substantially strong durable film.

BACKGROUND OF THE INVENTION

It has been proposed in the past to include various thermosetting materials such as melamineformaldehyde condensates in coating compositions based on an acrylic resin system. However, in general, such systems suffer one or more difficulties such as excessive hardness or stiffening when applied in sufficient quantity to give adequate resistance to organic solvents or aqueous liquids. If it is sought to improve this lack of flexibility, which becomes particularly troublesome at low temperature, by cutting down on the aminotriazine formaldehyde component of the coating the solvent resistance drops below an acceptable level. Various attempts have been made to maintain the low temperature flexibility characteristics and solvent resistance properties of such coating compositions while improving the durability and water-resistance of the substrates coated, particularly in the case of textiles and textile products to which the coatings are applied. However, this has proven to be an extremely difficult task in practice because of the fact that up to the present when one seeks to improve one property of the coating composition a difficulty arises with regard to diminution of one or the other of the needed physical properties. This difficulty is compounded because of the poor compatibility of those resins which will supply enhanced durability to the substrate being coated with those resins which will supply low temperature flexibility, water-resistance and solvent resistance to the substrate being treated.

It is a primary object of the present invention to provide the art with a method of coating various surfaces and substrates so as to impart improved durability, solvent-resistance, low temperature flexibility and water-resistance thereto in a manner readily adaptable to use with existing coating facilities.

It is a further object of the invention to disclose a unique coating composition which imparts all of these desirable properties to a substrate and which is composed of such readily compatible ingredients that it is capable of instant application with a minimum of effort. As a still further object the invention sets forth a method for the application of a durable water-resistant coating to textiles and other products with facility of operation and simplicity of technique. Other related objects and advantages of the invention will become apparent from the following general description of the method and its preferred mode of operation as described in the specific operative embodiments set forth hereinbelow.

THE INVENTION

In accordance with the present invention therefore, it has been found that the application in a precisely specified manner of a coating composition comprising (a) any crosslinkable acrylic ester polymer such as an acrylic copolymer formed by reaction of a resinous composition composed of a copolymerizable monoethylenically unsaturated monomer comprising about 1 to 10% by weight of glycidyl methacrylate and 70 to 99 percent by weight of at least one lower aliphatic ester of acrylic acid in a solvent mixture of 50 to 60% by weight of a saturated aliphatic alcohol of $C_1$ to about $C_7$ carbon atoms and 40 to 50% of an ester of a lower aliphatic carboxylic acid, (b) a polymerizable silicone prepolymer having unreacted pendant hydroxyl and hydrogen functions therein, and (c) any silane with carbon functional groups preferably types having a double bond such as a vinylalkoxysilane monomer having side reactive organic radicals which may be represented generally as:

$$RSi[OC_2H_4)_nCR']_3$$

wherein R is a vinyl radical, R' is a methyl or ethyl hydrocarbon radical, and $n$ is at least 1 but preferably not more than 7 and which, when admixed with the polymerizable silicone prepolymer (b) and cured with a suitable organic acid in the particular manner described in greater detail below, is capable of further reacting with an acrylic resin component (a) and upon final cure thereof of producing a permanent coating on a selected substrate which is water resistant, durable, chemically-resistant and yet quite flexible and free of cracking or crazing upon use.

In the preferred manner of use of our coating method or technique the composition employed has the acrylic resin component (a) present in from 50 to 90% by weight of the entire mixture, preferably about 80% by weight of the entire mixture; the polymerizable silicone prepolymer (b) having unreacted pendant hydroxyl and hydrogen functions present in from 2 to 12% by weight of the entire mixture and preferably about 7% by weight of the entire mixture. The third component the silane with carbon functional groups such as the vinylalkoxysilane monomer (c) is present in from 2 to 12% by weight of the total mixture and preferably in about 7% by weight. The balance up to 100% is curing agents, solvents and the like.

The novel coating technique which comprises the subject matter of the invention involves the use of the above unique formulation in the following characterizing sequence of process steps:

(1) Partially polymerizing to form an acrylic copolymer a copolymerizable monoethylenically unsaturated monomer mixture of glycidyl methacrylate and a lower aliphatic acrylic acid ester such as ethyl acrylate by slowly adding a mild organic acid such as benzoic or lactic acid to this mixture to partially polymerize the same.

(2) Separately adding and dissolving therein while controlling the pH to about 5.0–6.0 the polymerizable silicone prepolymer (b) having unreacted hydroxyl and hydrogen functions *into* the silane with carbon functional groups the vinylalkoxysilane monomer (c) until substantially all of the silicone prepolymer is dissolved therein. This silicone-silane solution-like blend could polymerize at a controlled rate depending upon the pH of the solution. At the same time through the carbon functional groups of the silane, especially those groups containing a point of ethylenic unsaturation, the blend is capable of copolymerization with other prepolymers, in this case the acrylic esters.

(3) Adding gradually with constant agitation the silicone silane prepolymer from step (2) containing free carbon functional groups such as vinyl groups into the partially polymerized acrylic copolymer from step (1).

(4) Coating the same on a substrate and completing the cure to a hard durable yet flexible film.

While the applicant does not wish to be bound by any particular explanation for the possible reaction which takes place during the polymerization of the silicone system containing the silane-silicone blend from step (2) it does appear from available evidence that part of the carbon-functional groups of the silane react first with the reactive group of the polymerizable silicone fluid and then the unreacted carbon-functional groups act as a bridging point or "cement" between the whole silicone system and the acrylic component which has available points of ethylenic unsaturation to effect a cross-linking between the two systems. After coating and total polymerization, this acrylic-silicone hybrid leaves on the surface of the substrate a flexible and durable film.

As a final cure of the mixture in most instances additional organic acid is normally added to the product of step (4) to adjust the pH in the system to within the range of pH 5.0 to pH 6.0. If the pH of the system goes below 5.0 there occurs the danger of premature curing and if it rises in excess of about 6.0 the cure is unduly delayed. The organic acids content varies from about 2 to 4% by weight of the total mixture and is normally composed of acids such as lactic acid, benzoic acid, paratoluene sulfonic acid, to name a few of such well known acid curing agents. For promoting and accelerating final polymerization to both acrylic and silicone systems, a catalyst is added. For the acrylic resins a mild organic acid is used. The optimal pH is within the range pH 5.0 to pH 6.0. The polymerization of the silicone system is accelerated by the presence of polyvalent metals in form of organo metallic complexes such as lead naphthenate, tin oleate, ferro-oleate, etc. In some instances, quite to the contrary, it is advantageous to have a slow polymerization at room temperature over a longer period of time and in such case no catalytic promoter is added to the mixture.

By way of illustration of the unexpected criticality of the expressed mode of operation outlined above, it has been found that if instead of a polymerizable silicone fluid reacted with the vinyl silane monomer one employs a silicone resinous prepolymer having reactive hydrogen groups or atoms the durability of the final cured product drops sharply indicating that the cross-linking system will not function to give a sufficiently formed polymer upon cure.

The acrylic resin component (a) could be a copolymer of glycidyl methacrylate with such acrylic acid esters as methylacrylate, ethyl acrylate, isopropyl acrylate, n-propyl acrylate, n-butyl acrylate and other butyl acrylates, 2-ethylhexyl acrylate, lauryl acrylate or octadecyl acrylate to name a few. Besides the glycidyl methacrylate and alkyl acrylate the copolymer may comprise up to 20% by weight of such materials as cyclohexyl acrylate, benzyl acrylate, methacrylates such as methyl methacrylate, ethyl methacrylate and butyl methacrylate, vinyl toluene, acrylonitrile, vinyl acetate or vinylidene chloride. The copolymer may be prepared in any suitable fashion provided it has a molecular weight in the range of about 50,000 to 250,000 viscosity average. As a general rule this molecular weight is most easily obtained by solution polymerization or by emulsion polymerization with use of chain-transfer agents. This is only illustrative of the invention since any of a number of well known acrylic resin systems could be employed in an equivalent manner.

The polymerizable silicone prepolymer having unreacted hydroxyl and hydrogen groups therein is capable of reaction with both the unreacted ethylenic linkages of the acrylic resin component (a) and the vinyl groups of the vinylalkoxysilane monomer (c) by reason of the existence of both of these functions. This silicone component may be prepared in a manner generally described in Rochow patent, U.S. 2,258,218 and involves a hydrolysis of a suitable alkyl silicon halide and dehydration of the resulting hydroxy product to obtain a monomethyl or dimethyl silane which is then polymerized.

A typical hydroxylated silicone prepolymer is composed of a large number of units of the probable structure A:

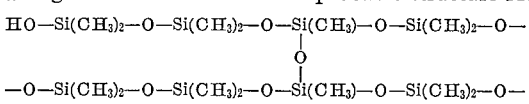

In the particular product found most suitable herein the silicone copolymer is a mixture of about 92 percent dimethylpolysiloxane units as shown above:

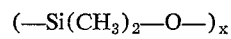

and about 8 percent monomethylpolysiloxane units:

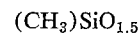

wherein $x$ is a very large number sufficient to give a polymeric product of 20 centistokes viscosity at 25° C.

Such chains of alternate Si and O atoms may be terminated by on OH group (as in structure A above) which may react further or be terminated by a —Si(CH$_3$)$_3$ group which prevents further reaction. Conversely, whenever a —Si(OH)$_3$ grouping enters the chain the possibility of further reactivity and cross-linking becomes evident. It is this type of reactive silicone which has been employed in our unique method while the other available silicones with less reactive sites were not successful.

With regard to the bridging component vinylalkoxysilane (c) so important to the function of our new method of coating as outlined above these monomers may be prepared by directly esterifying the corresponding vinylchlorosilane with a slight excess of hydroxyl containing alkylene oxide molecule containing material followed by fractional distillation at reduced pressure or alternatively esterifying the vinylchlorosilane with a low boiling alcohol, such as ethanol and then conducting a transesterification reaction to replace the ethoxy group with the desired alkoxy substituent. A suitable catalyst such as paratoluene sulfonic acid may be employed to speed up the transesterification reaction.

Some particularly useful vinylalkoxysilanes within the framework of the invention would be vinyl tris - 2 - methoxyethoxy silane, vinyltrismethoxydiethyleneglycoxysilane, and monomethoxypolyethyleneglycoxydiethoxyvinylsilane. These monomers generally upon cure form polymers which range in molecular weight from about 200 to 600 when cured by themselves although when acting as cross-linking agents the size of the linking material is more difficult to determine.

During the course of partially curing the acrylic resin component (a) a small amount of a suitable acid catalyst in amount of about 0.1 to 2.0% by weight of the copolymer present in the composition may be employed. Such catalysts as benzoic acid, lactic acid, butyl phosphoric acid, paratoluene sulfuric acid, oxalic acid, maleic acid, as well as the amine salts of such acids may be employed. The vinyl silane-silicone system may be likewise partially cured in a similar manner with the precaution taken to insure that the pH of the system is kept between about a 5.0 and 6.0 to prevent too rapid uncontrolled cure at lower pH or too prolonged a cure at a higher pH. If it is desired to accelerate the cure of the system as is frequently the case, a known promoter for the acid cure such as 28 percent solution of tin octoate or the like curing accelerators may be added. If a curing catalyst is not employed the system may take up to a week to cure at room temperature.

Once the coating composition is made up in the manner indicated it is applied in one or more coats to the substrate from an organic solvent solution of from 50 to 60% lower aliphatic alcohol and 40-50% of a lower alkyl ester of a lower carboxylic acid such as ethyl acetate. It is important to keep the level of alcohol in the solvent system at least at 50% of the total or else the transparency of the coating is dissipated by clouding over and the appearance of the treated article suffers.

Any suitable method of applying the coating to the fabric or other substrate may be employed such as roll coating, knife-coating, spraying, brushing or dipping. The concentration and viscosity of the coating are of course determined by the particular means of application selected to place the coating on the substrate. The coating may be applied in successive layers to the substrates, but usually one coat gives satisfactory results. After application the coating is dried to remove most of the solvent. The drying temperature ranges from 170° F. to 200° F. and preferably at 180° F. for 20 to 30 seconds. The drying process is followed by a curing step which is normally conducted at temperatures ranging from 320° F. to 380° F. for from 15 to 30 seconds depending on the heat resistance temperature of the substrate.

The novel coating technique may be employed in coating all sorts of textile fabrics such as garments needing water proofing or water repellancy. This would, of course, apply to such garments as raincoats, and outerwear formed of nylon, rayon, Dacron, cotton, and the like, which by the application of the present invention can be rendered water repellant and water-borne soil-resistant as well as resistant to organic solvents employed in dry cleaning and the attacks of harsh solvent systems employed in cleaning the garments.

In a like manner our coating technique can be employed to film or coat various other substrates such as panel board and plywood, tin foil, or other flexible metal films, plastic films such as polystyrene, polyethylene, polypropylene, rubber sheets of butadiene, styrene-butadiene and the like as well as glass or polyester translucent panels or panes.

In still other areas of use our coating technique and composition involved therein may also be used for waterproofing or rendering water-repellant umbrellas, auto seatcovers, awnings, knapsacks, leather goods such as shoes, boots, luggage and various other items of commerce where durability, water-repellancy and flexibility are all important to the use of the article. Because of the chemical inertness and water repellancy imparted thereby the coatings are useful for coating paper and the various and sundry items formed therefrom such as book covers and the like.

A particular blend of properties obtained by our technique of coating is believed to be due to the fact that the durability and resistance to chemical attack of the acrylic resins is blended with the water-repellancy and flexibility of the silicone resins and the entire system is compatibly tied together by our silane system. This compatibility is totally unexpected since it had hitherto been considered impossible to blend these resins into a compatible system. The criticality of our method of processing can be shown by reference to the following hydrostatic test data which compares a treatment with the resinous system of our invention using a polymerizable silicone fluid having hydroxyl and hydrogen reactive groups, a silane with carbon-function groups and cross-linkable acrylic resins (Composition A) with a resinous system wherein the silicone polymer is one without pendant hydroxyl function but merely reactive H sites (Composition B) yet can be seen from the test data presented on Table I below that Composition B forms a residual film on the substrate which is for inferior in quality than the film formed from Composition A. In the same manner, Composition C prepared by simultaneously mixing the acrylic copolymer, the silane monomer with carbon-functional substrate which is far inferior in quality than the film groups and the polymerizable fluid failed to react or polymerize to a degree where it could be even employed and totally was deficient in use.

TABLE I

| Test sample: | Hydrostatic test data [1] |
|---|---|
| Composition A | cm___ 81 |
| Composition B | cm___ 45 |
| Composition C | cm___ 40 |

[1] In cm./H$_2$O/inch$^2$ required for H$_2$O penetration.

TEST METHODS (1) For evaluation of the resistance to water penetration of the coated fabrics the hydrostatic pressure test method ASTM-D-583-63 Method II was used. The recorded readings are the averages of three tested specimens.

(2) The dry cleaning tests were conducted in perchlorethylene (PCE) at 80° F. Each cycle lasted fifteen minutes. Between the cycles the specimens were dried and tested for resistance to water penetration. Before testing, the samples were conditioned for 24 hours.

(3) The washing tests were conducted in a home-type automatic washer for a full cycle of approximately 60 minutes. A 0.5% solution of a low sudsing mild detergent was used. Before testing, the samples were conditioned for 24 hours.

(4) The low temperature flexibility tests were conducted on a comparative basis. As a standard an uncoated sample of the fabric was used. Each time a coated and an uncoated specimen were placed for 60 minutes in a controlled temperature cold-chamber.

The patentable merit of the invention is illustrated when viewed in the light of the following deficiencies of the prior practice.

(1) The durable waterproof coatings made heretofore with crosslinkable acrylic esters are of a multiple layer operation.

(2) Two coating solutions are needed—a tacky base coat, and a dryer top coat.

(3) The coated substrates possess a residual tackiness which is highly undesirable, especially in the garment industry. Using a higher percentage of catalyst, or employing prolonged curing periods, does not eliminate this undesirable effect.

(4) The drying and curing periods are too long.

(5) The low temperature flexibility of the coated textiles is very poor.

The purpose of the present invention therefore is to introduce new elements into these coating compositions which will coat a substrate, without impairing the basic properties of the coatings, and hence eliminate the aforesaid disadvantages. The invention thus provides the following valuable benefits:

(1) It performs the process of waterproofing in one single operation, eliminating the necessity of a multilayer operation.

(2) It uses one coating solution.

(3) It improves the waterproofness of the substrate. With the same amount applied per square yard the hydrostatic head readings are higher than those readings taken on coatings formed with the nonmodified acrylic ester coating solutions by a factor of 2.

(4) It eliminates the residual tackiness on the substrate.

(5) The drying and curing periods are very short.

(6) It gives to the coated fabrics outstanding low temperature flexibility.

(7) It gives the coated fabric properties which facilitate handling when cutting and sewing.

The following examples will illustrate the invention. In these illustrative examples the parts and percentages are by weight unless otherwise specifically indicated. The comparative tests will be based on the hydrostatic head readings of the coated substrates.

EXAMPLE 1 (Comparative)

(a) Into a stainless steel beaker fitted with stirrer was charged 95.3 parts by Acryloid K–7003 (40% solution of a copolymer comprising from 1–10% by weight of glycidyl methacrylate from 0–19% cross-linking agent such as acrylonitrile and from 70–90% by weight of at least one ester of acrylic acid, i.e. ethyl acrylate) and 4.7 parts of Catalyst MS (10% solution of benzoic acid in xylene). The blend was stirred for 30 minutes.

(b) A second breaker provided with a stirrer was charged with 95.3 parts of Acryloid K–7004 (40% solution of a copolymer comprising from 1–10% by weight of glycidyl methacrylate from 0–19% cross-linking agent such as acrylonitrile and from 70–90% by weight of at least one ester of acrylic acid, i.e. ethyl acrylate) and 4.7 parts of Catalyst MS (10% solution of benzoic acid in xylene). The blend was stirred for 30 minutes.

(c) The solution of part (a) was applied to an unfinished 70 den. 90/110 nylon taffeta fabric by a floating knife coater at a rate of about 1/16 oz. per sq. yd. to provide a base coat thereon after which the coated fabric was dried at 240° F. for five minutes.

(d) The solution of part (b) was applied as the top coat over the base coated fabric at the same rate as the base coat.

After drying at 240° F. for five minutes and cure for five minutes at 360° F. the coated fabric has some waterproofness and some resistance to dry-cleaning and washing. The hand of the fabric however, has a marked residual tackiness and the cold-flex property of the coated fabric is very poor.

Hydrostatic pressure tests.—(ASTM D–583–63 Method II) average of three tested samples.

Hydrostatic head readings (in cm. H$_2$O column to penetration of sample):

Originally—39 cm.
After 5 PCE (perchloroethylene) dry cleanings—30 cm.
After 1 hour wash at 140° F.—22 cm.

EXAMPLE 2

(a) A stainless steel beaker fitted with a stirrer was charged with 61 parts of Acryloid K–7003 (40% solution of a copolymer comprising from 1–10% by weight of glycidyl methacrylate from 0–19% of a cross-linking agent such as acrylonitrile and from 70–90% by weight of at least one ester of acrylic acid, i.e. ethyl acrylate) and 14 parts of Acryloid K–7004 (40% solution of a copolymer comprising from 1–10% weight of glycidyl methacrylate from 0–19% of a cross-linking agent such as acrylonitrile and from 70–90% by weight of at least one ester of acrylic acid, i.e. ethyl acrylate). The blend was mixed during 30 minutes. Into the mixed blend was added four parts of Catalyst MS (10% solution of benzoic acid in xylene) and the whole content of the beaker stirred for another 30 minutes.

(b) Into a second stainless beaker provided with a stirrer was charged 5.3 parts of Vinylsilane A–172 (vinyl-tris-2-methoxylethoxyl-silane) and while stirring 5.1 parts of SF–99 (hydroxy polydimethylsiloxane) was gradually added into the Vinylsilane. After the blend was stirred 20 minutes, .05 part of Nuocure 28 (28% solution of tin octoate) was added into the silicones blend and an additional mixing of 15 minutes was done. Before addition, the amount of Nuocure 28 was diluted in ratio 1:3 in a solvent mixture containing 40 parts of methanol, 60 parts of ethylacetate.

(c) Blend (b) was gradually added into blend (a) while stirring continuously. The new blend was adjusted to 100 parts with a solvent mixture containing 40 parts of methanol and 60 parts of ethylacetate. A final stirring of 30 minutes was done.

(d) The resulting solution was applied to a dyed but unfinished 70 den. 90/110 nylon taffeta fabric by a floating knife coater at a rate of about 1/8 oz. dry weight per sq. yd. The coated fabric was dried at 220° F. for 1 minute and then cured for 1 minute at 360° F. By this process the coated fabric obtained an excellent durability to drycleaning and durability to washing waterproofness. The "hand" of the fabric was not affected. The cold-flex property of the coated fabric is very good and resistance to staining and soiling is also good.

Hydrostatic pressure tests.—(ASTM D 583–63) Method II. Average of three tested samples.

Hydrostatic head readings (in cm. H$_2$O/columns to penetration of sample).

Originally—81 cm.
After 5 PCE dry cleanings—63 cm.
After 1 hour household wash at 140° F.—46 cm.

EXAMPLE 3

(a) Into a stainless beaker provided with a stirrer was charged 58 parts of a second acrylic resin in liquid form comprising a copolymer of 85% of a lower alkyl acrylate i.e. butyl acrylate and 15% of a crosslinking monomer such as acrylonitrile having free reactive isocyanate groups. This acrylic resin was in an organic solvent methylene chloride and while it was selected to illustrate our invention any one of a large number of commercially available acrylic resinous copolymer blends could be substituted equivalently herein to obtain equally good result. The blend was stirred for 30 minutes. Into the stirred blend was added 4.5 parts of E.O.P. (ethyl-acidorthophosphate—10% solution in toluene) and an additional stirring of 30 minutes was done.

(b) Into another stainless beaker fitted with a stirrer 5.1 parts of silane A–186 [beta - 3,4(epoxycyclohexyl) ethyltrimethoxy silane] was charged and while stirring 4.9 parts of silicone fluid SF–99 (hydroxy polydimethylsiloxane) was gradually added into the silane A–186. After the blend was stirred 20 more minutes, 0.03 part of 30% solution of 24% lead naphthenate was added into the silicones blend. An additional stirring of five minutes was done.

(c) Solution (b) was gradually added into solution (a) while stirring continuously. The new blend was adjusted to 100 parts with toluene. A final stirring of 10 minutes was done.

(d) A 70 den. dyed but unfinished 90/110 nylon taffeta fabric was knife-coated with the above solution at a rate of about 1/8 oz. (dry weight) per sq. yd. The coated nylon fabric was dried at 220° F. for 1 minute and afterwards cured for one minute at 360° F. The coated nylon fabric possessed an excellent durability to drycleaning and washing waterproof properties. The "hand" of the coated fabric was the same as the coated fabric of Example 2. The cold-flex property of the fabric is outstandingly good.

Hydrostatic head readings (Method as Example 1):

Originally—80 cm.
After 5 PCE drycleanings—64 cm.
After 1 hour wash at 140° F.—49 cm.

EXAMPLE 4 (Comparative Example)

(a) A beaker provided with a stirrer was charged with 61 parts of Acryloid K–7003 (40% solution of a copolymer comprising from 1–10% by weight of glycidyl methacrylate and from 70–90% by weight of at least one ester of acrylic acid, i.e. ethyl acrylate) and 14 parts of Acryloid K–7004 (40% solution of a copolymer comprising from 1–10% by weight of glycidyl methacrylate and from 70–90% by weight of at least one ester of acrylic acid, i.e. ethyl acrylate). The blend was stirred for 30 minutes.

(b) Into a second beaker fitted with a stirrer was charged 5.3 parts of vinyl silane A–172 (vinyltris-2-methoxyl-ethoxyl-silane), and while stirring 5.1 parts of SF L–31 (polydimethyl polysiloxane) was gradually added into the vinyl-silane. After the blend was stirred for 20 minutes .05 part of Nuocure 28 (28% solution of tin octoate) was added into the silicones blend and an additional stirring of 15 minutes was done. Before additional Nuocure 28 diluted in ratio 1:3 in a solvent mixture containing 40 parts of methanol and 60 parts of ethylacetate.

(c) Blend (b) was gradually added into blend (a) and afterwards processed as in Example 1.

(d) A 70 den. 90/110 nylon taffeta fabric was knifecoated with the solution at a rate of ⅛ oz. (dry weight) per sq. yd. Afterwards the coated fabric was processed as in Example 2. The fabric had the same "hand" as the fabric of Examples 2 and 3, but the hydrostatic head readings were lower to a degree where the product was not satisfactory.

Hydrostatic head readings (ASTM–D–583–63–Method II):

Originally—45 cm.
After 5 PCE drycleanings—26 cm.
After 1 hour wash at 140° F.—20 cm.

EXAMPLE 5 (Comparative Example)

(a) Into a beaker provided with a stirrer was charged 61 parts of Acryloid K–7003 (40% solution of a copolymer comprising from 1–10% by weight of glycidyl methacrylate and from 70–90% by weight of at least one ester of acrylic acid, i.e. ethyl acrylate) and 14 parts (by weight) of Acryloid K–7004 (40% solution of a copolymer comprising from 1–10% by weight of glycidyl methacrylate and from 70–90% by weight of at least one ester of acrylic acid, i.e. ethyl acrylate). The blend was processed as in Example 1, with catalyst MS (10% solution of benzoic acid in xylene).

(b) A second beaker fitted with a stirrer was charged with 5.3 parts of silane A–156 (dimethyldichlorosilane) and processed with SF–99 (polydimethylsiloxane) and Nuocure 28 (28% solution of tin octoate) as in Example 1.

(c) Blend (b) was gradually added to blend (a) and the new blend processed as in Example 1.

(d) A nylon fabric similar to those in the previous examples was knife-coated with the resulting solution and the coated fabric further processed as in Example 2. The "hand" of the coated fabric was satisfactory but the hydrostatic head readings were much lower.

Hydrostatic head readings (ASTM–D–583–63–Method II):

Originally—51 cm.
After 5 PCE drycleanings—32 cm.
After 1 hour wash at 140° F.—22 cm.

In the illustrative examples (except for the first one) there are two separate cross-linkable systems, each provided with its catalyst, which in the final state achieves some degree of random bridging. The better the bridging, the better are the hydrostatic pressure readings. Any attempt to give a diagrammatical representation of the chemical reaction which could take place after the crosslinking of the acrylic and silicone systems will be necessarily speculative. However, a chemical description of the constituents in the formulations and a theoretical discussion of the probable chemical reactions which could take place will throw some light on the subject and provide some useful information about the probable crosslinking mechanisms of the monomers and polymers involved in the crosslinking reaction. The evaluation of the hydrostatic pressure test results of the illustrative examples, which will follow this description, will provide some experimental support of the theoretical assumptions. The following is the chemical description of the six components used in the formulation of Example 2:

1. Self-crosslinkable acrylic esters

An acrylic monomer ester could be presented as

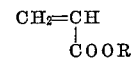

The self-crosslinkable acrylic ester now contains beside the $CH_2=CH<$ group some other functional groups which permit them to react with themselves and build three dimensional networks. The reason for using two types of acrylic esters in the formulation is for the final "hand" of the coated fabric and has nothing whatever to do with the crosslinking reaction itself. The prepolymer of course would be made up of these units.

2. A solution of an organic acid

Self-crosslinkable acrylic polymers tend to cure with heat alone, but the process is slow and could be incomplete. An acid medium in the range pH 5–6 accelerates the crosslinking. A high degree of crosslinking in the polymer results in higher resistance to drycleaning solvents and washing emulsions. The catalyst MS is the component in the formulation which provides the acid medium.

3. A carbon-functional silane monomer

These silicone chemicals have both the high reactivity of silanes and the characteristic properties of the organic group attached to them. They are represented by the following structural formula:

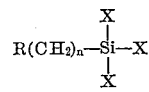

where R represents a reactive organic functional group such as vinyl, epoxy, nitrile, isocyanate or amino attached to the terminal carbon of the silicon-carbon side chain, and X represents a readily hydrolyzable group such as a lower alkoxy group, or a halogen such as a chloro group where no problem of color change exists, $n$ is from 0 to about 20.

Being in the monomer state and because of their high reactivity, these carbon-functional silicones possess a solvent-like property for some silicone compounds. The vinyl silane A–172 belongs to this family of organofunctional silanes. Vinyl silane A–172 has the following chemical formula:

$$CH_2=CHSi(OC_2H_4OCH_3)_3$$

The organic function attached to the terminal carbon of the silicon-carbon side chain is a vinyl group. The hydrolyzable groups are 3 methoxyethoxy groups, which after the hydrolysis build methanol and ethanol, readily removed in the drying and curing process. The vinyl double bond here provides the bridge between the acrylic and silicone system.

4. Silicone fluids

Silicone fluids (abb. SF) are chemically polydimethylsiloxane (DMS) and could be represented as:

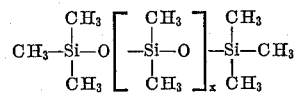

They are generally inert and non-reactive materials.

There is another group of DMS which are very reactive fluids and could be represented by the following chemical formula:

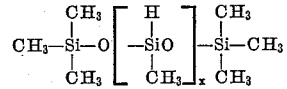

Whereas the first group of DMS are inert fluids the second group of DMS, because of the ≡Si—H bond, are highly reactive materials.

For some applications, a third type of silicone fluids are used. With respect to the reactivity they stay between the precedent types. In order to overcome the high reactivity of the DMS with the ≡S—H bonds, they are usually mixed with a less active DMS, which contains some silanol groups ≡Si—OH. The silanol hydrolyzate contains molecules in which the chain-ending group is not a methyl but an OH group:

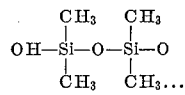

Somehow the two groups block each other and their reactivity takes place in the presence of a hydrolyzing medium. The presence of polyvalent metal catalyzes the reaction. The mechanism of the reaction is a silanol condensation. Alkaline medium accelerates the reaction, acid medium slows it down. The circumstance that the final coating solution is on the acid side (about pH 5.5) keeps the silicone system from premature polymerization, which should occur during the drying and curing processes on the coated substrate itself in order to achieve a simultaneous crosslinking with the acrylic system.

5. An organo-metallic complex

As mentioned previously, silanol condensation is catalyzed by the presence of a polyvalent metal. The organo-metallic complex provides the polyvalent metal. In order to achieve optimum workable coating conditions, the following points should be observed:

The catalytic strength of the various metals ranges decreasingly Pb, Sn, Zn, Fe. Heat and duration of time are also factors affecting the speed of the crosslinking reaction. By selecting the right catalyst and coordinating correct time duration and temperature ranges one can fairly well control the pot-life of the coating solution and adapt it to the specific conditions of a coating unit. Taking into consideration all these variables and with regard to the type and end use of the coated substrate it is necessary through laboratory experiments to establish the appropriate ratio of catalyst to the amount of silicone fluid used in the formulation. The crosslinking mechanism is probably a random bridging between the networks of both systems. In the case of Example 2 on the one hand we have the catalyzed acrylic esters blend; on the other hand we have a catalyzed solution-like blend of the silicone fluid in the silane. When heat is applied each system starts its own crosslinking process. But at the same time through the acrylic and vinyl-double bonds the two systems formed random bridges between the two crosslinkable networks. In this way a waterproof silicone fluid polymer with an extremely low glass-transition temperature is introduced into the crosslinked structure of the acrylic esters. At the same time, as in the case of textiles, the amount of natural moisture present in the substrate favors the hydrolysis of the silane on the substrate itself. This condition improves the anchorage of the waterproof film to the substrates, and eliminates the need of a base coat.

The final result is that this crosslinked hybrid gives to the residual dry and cured film on the substrate excellent durable watreproof and coldflex properties.

The evaluation of the illustrative examples is done on the basis of the hydrostatic pressure test readings of the tested coated samples.

The hydrostatic head readings of the samples in Example 1 are very low. The coating does not have the additional benefits of a silicone fluid polymer crosslinked in the acrylic system networks. Example 2 was already discussed as representing the inventive method. The test results of Example 3 are almost similar to those in Example 2. The reason is the following:

Despite the use of different chemicals, other than those used in Example 2, the chemical function of the components used in the coating composition of Example 3 are the same chemically as in Example 2. The acrylic system contains two crosslinkable acrylic esters and an organic acid for catalyst. The silicone system contains a blend of a polymerizable silicone fluid with a carbon functional silane. In this case the carbon functional group is an epoxy group, instead of a vinyl. The organo metallic complex is a lead naphthenate. The bridging of both systems occurs probably between the acrylic and epoxy double bonds.

The test readings from Example 4 are lower than those in Examples 2 and 3. In this case instead of a polymerizable silicone fluid containing ≡S—H and some ≡S—OH groups, a silicone fluid is used having exclusively ≡S—H groups. This type of silicone fluid, as mentioned before, is very reactive. The crosslinking process in the silicone fluid system is too fast. It probably does not have the opportunity to bridge with the acrylic system.

In Example 5 the coating solution contains instead of a carbon functional silane a silane without an active side group. The hydrostatic head readings are poor. No bridging probably occurs between the acrylic and silicone systems.

The following is a tabulated comparison of the results individually obtained and disclosed in the 5 preceding examples. It is believed that this summary will render quite clear the unexpected benefits obtained by the operation of the invention.

TABLE II

| Example | Type | Initial | Hydrostatic test readings [1] | |
| | | | After 5 cleanings in PCE solvent | After 1 hour wash at 140° F. |
|---|---|---|---|---|
| I | Comparative | 39 | 30 Unsat | 22 Unsat. |
| II | Illustrative | 81 | 63 Good | 46 Good. |
| III | do | 80 | 64 Good | 49 Good. |
| IV | Comparative | 45 | 26 Unsat | 20 Unsat. |
| V | do | 51 | 23 Unsat | 22 Unsat. |

[1] As measured by ASTM TEST D-583-63 and reported in cm. of $H_2O$ in an inch square column required to force penetration of sample of treated fabric.

EXAMPLE 6 (Comparative)

For purposes of providing the criticality of our method the following experiments were run. An attempt was made to mix first a cross-linkable acrylic resin with a carbon functional silane and then add into the blend a polymerizable silicone.

Preparation of the coating composition (a) In a vessel provided with a stirrer charge 62.00 parts Acryloid K–7003 (acrylic copolymer identified above in Example 1) and 14.00 parts Acryloid K–7004 (acrylic copolymer identified above) and blend for 30 minutes. Add 4.00 parts of catalyst MS (10% solution of benzoic acid in xylene). Gradually add 5.30 parts of vinyl silane A–172 (vinyltris-2-methoxy-ethyloxyl-silane) with constant stirring.

(b) Blend 5.10 parts of SF–99 (polydimethyl siloxane) and 0.05 part of Nuocure 28 (28% solution of tin octoate) and mix for 15 minutes.

(c) Add blend (b) into blend (a) while stirring continuously. Adjust to 100 percent with a 40/60 mixture of methanolethyl acetate.

(d) A nylon taffeta fabric was coated with the above coating solution, dried and cured respectively at 2220° F. for 30 seconds then stored at room temperature for 24 hours before testing.

Testing and evaluation

The hydrostatic pressure test readings were taken on the coated fabric originally and after drycleaning with perchloroethylene the test gave unsatisfactory results as will be seen (average of 3 tests):

Original—36; After 5 cleanings—22; After 1 hour hot wash—27.

Despite the presence of a carbon fractional silane in the coating composition the readings from ASTM D–583–63 are very poor. The silicone not being introduced into into the acrylics as a solution in the carbon functional silane, both acrylics and silicones polymerize indivdually without bridging and hence lack the water resistant strength.

EXAMPLE 7 (Comparative)

For the sake of further showing the unexpected nature of our new process the procedure involved was varied by an attempt to prepare a blend of acrylic resins and silicone resins and try to cross link them after blending by adding into the blend a vinyl silane (vinyltris-2-methoxyethoxy-silane). The evaluation of this effort was to be made with reference to the hydrostatic test method noted above.

Preparation of the coating composition (a) In a vessel provided with a stirrer charge 62.00 parts of Acryloid K–7003 acrylic copolymer resin identified above in Example 1) and 14 parts Acryloid K–7004 acrylic resin and blend for 30 minutes. Add 4.00 parts of benzoic acid catalyst as in the preceding example, and stir for 30 minutes.

(b) Add 5.10 parts of polydimethylsiloxane to (a) and mix for 15 minutes.

(c) Blend 5.30 parts of vinyltris-2-methoxyethoxy-silane with 0.05 part of a 28% solution of tin octoate and mix for 20 minutes. Add blend of (a) and (b) into blend (c) with constant stirring. Adjust to 100% with solvent and coat a nylon taffeta fabric with the composite as in Example 6 above.

Testing and evaluation

The coated fabric sample was subjected to the hydrostatic pressure test as in the preceding examples. The fabric was tested originally; after 5 drycleanings in a commercial solvent such as perchloroethylene and after 1 hour hot washing, the results were as follows (ASTM D–583–63 Test [1]):

Original—21; After 5 cleanings—21; After 1 hour hot wash—19.

As can be seen from the low test readings these are even poorer than in preceding Example 6. The main reason for the lack of water resistance to penetration is the lack of bridging between the acrylic and silicone resin systems.

EXAMPLE 8

This example illustrates the practice of our invention as it is applied to a polyester fabric substrate. This coating in particular has durability as well as water resistance. The specific textile employed here was a 150 denier white thermoset unfinished polyester taffeta.

Preparation of coating composition (a) In a vessel provided with a stirrer charge 62.00 parts of Acryloid K–7003 and 14.00 parts of Acryloid K–7004 (both acrylic copolymers as described in Example 1 above) and 4.00 parts of a benzoic acid catalyst and blend with stirring for 30 minutes.

(b) Blend 5.30 parts of vinyltris-2-methoxyethoxy-silane, with 5.10 parts of polydimethylpolysiloxane and 0.05 part of a 28% solution of tin octoate and mix for 20 minutes. Add blend (b) into blend (a) with constant stirring and adjust to 100% with solvent (40/60 methanol/ethylacetate).

(c) Coat a polyester taffeta, i.e. a polymeric condensate of dimethylterephthalate-ethylene glycol, dry at 220° F. for 30 seconds and cure at 400° F. for 40 seconds.

Testing and evaluation

Subject the coated fabric sample to hydrostatic pressure test ASTM D–583–63 as in the preceding examples. The results are excellent both initially and after repeated drycleaning and washing. The results are as follows (ASTM D–583–63 Test [2]):

Original—94; After 5 cleanings—78; After hot wash—1 hr., 79; 2 hrs., 76.

EXAMPLE 9

This example illustrates the practice of our invention as it is applied to waterproofing a polyester fabric with a slightly different carbon functional group employed, i.e. a beta-(3,4 epoxycyclohexyl) ethyltrimethoxy silane in this instance. This coating in particular has durability as well as excellent water resistance.

Preparation of coating composition (a) In a vessel provided with a stirrer charge 62.00 parts of Acryloid K–7003 and 14.00 parts of Acryloid K–7004 (both acrylic copolymers as described in Example 1 above) and 4.00 parts of a benzoic acid catalyst and blend with stirring for 30 minutes.

(b) Blend 5.0 parts of beta(3,4 epoxy-cyclohexyl) ethyltrimethoxy silane with 5.10 parts of polydimethylpolysiloxane and 0.05 part of a 28% solution of tin octoate and mix for 20 minutes. Add blend (b) into blend (a) with constant stirring and adjust to 100% with solvent (40/60 methanol/ethylacetate).

Testing and evaluation

Subject the coated fabric sample to hydrostatic pressure test ASTM D–583–63 as in the preceding examples. The results are excellent as will be evident (ASTM D–583–63 Test [3]):

Original—94; After 5 cleanings—83; After hot wash—1 hr., 80; 2 hrs., 79; 3 hrs., 74.

The acrylic copolymers employed in the aforesaid examples are more elaborately defined in U.S. Pat. 3,025,181 which disclosure is incorporated by reference herein. The vinyl silane is prepared by the manner shown in U.S. Pat. 2,965,515 which is incorporated by reference herein.

What is claimed is:

1. A method for imparting a durable water-resistant and water-repellant film to a flexible or rigid substrate with a solution type coating composition which comprises (a) partially curing to an acrylic copolymer a copolymerizable mixture of about 1 to 10% by weight of a monoethylenically unsaturated monomer of glycidyl methacrylate and 70% to 99% parts by weight of a lower aliphatic acrylic acid ester;

(b) separately reacting under controlled conditions of acidity between a pH of 5 and 6 a mixture of an alkyl substituted silicone prepolymer having pendent hydroxy functions and a vinylalkoxysilane monomer of the formula $$RSi[(OC_2H_4)_nOR^1]_3$$

in which R is a vinyl radical, $R^1$ is methyl or ethyl and $n$ is at least one and not more than 7; by adding

---

[1] Centimeters of $H_2O$ in a 1 inch [2] column required to force penetration of the coated fabric (average of 3 test runs).

[2] Values in centimeters of $H_2O$ in a 1 inch [2] column required to force penetration of the coated fabric (average of 3 test runs).

[3] Values in centimeters of $H_2O$ in a 1 inch [2] column required to force penetration of coated fabric (average of 3 test runs).

the silicone prepolymer slowly to the vinylalkoxysilane until the silicone prepolymer is substantially dissolved therein;

(c) adding the silicone prepolymer-vinylalkoxysilane reaction product into the partially polymerized acrylic copolymer to form a flowable coating composition; and (d) applying said coating composition to a substrate, and curing to completion of a resinous film; and wherein said acrylic copolymer comprises about 50 to about 90% by weight of said composition coated on said substrate and each of said silicone prepolymer and said vinylalkoxysilane comprise about 2 to about 12% by weight of said composition coated on said substrate.

2. A method according to claim 1 wherein the coating composition on the substrate is cured by heating to a temperature in excess of 170° F.

3. A method according to claim 1 for imparting a durable water repellant film to a plastic substrate comprising a polymeric condensate of dimethyl terephthalate and ethylene glycol.

4. A method according to claim 1 which includes the additional step of adding said coating composition to an organic solvent system comprising at least 50% of a lower aliphatic alcohol prior to applying said coating to said substrate.

5. A method according to claim 1 wherein said curing is carried out at a temperature between about 320° F. to about 380° F.

6. A method according to claim 1 wherein an organic acid is added to said flowable composition prior to curing said composition to completion.

7. A coating composition for imparting a durable water-resistant and water-repellant film to a flexible or rigid substrate prepared by the method which comprises:

(a) partially curing to an acrylic copolymer a copolymerizable mixture of about 1 to 10% by weight of a monoethylenically unsaturated monomer of glycidyl methacrylate and 70% to 99% parts by weight of a lower aliphatic acrylic acid ester;

(b) separately reacting under controlled conditions of acidity between a pH of 5 and 6 a mixture of an alkyl substituted silicone prepolymer having pendent hydroxy functions and a vinylalkoxysilane monomer of the formula $$RSi[(OC_2H_4)_nOR^1]_3$$

in which R is a vinyl radical, $R^1$ is methyl or ethyl and n is at least 1 and not more than 7, by adding the silicone prepolymer slowly to the vinylalkoxysilane until the silicone prepolymer is substantially dissolved therein;

(c) adding the silicone prepolymer-vinylalkoxysilane reaction product into the partially polymerized acrylic copolymer to form a flowable coating composition; and wherein said acrylic copolymer comprises about 50 to about 90% by weight of said composition and each of said silicone prepolymer and said vinylalkoxysilane comprise about 2 to about 12% by weight of said composition.

8. A flexible fabric substrate coated with the composition of claim 7.

9. A flexible fabric substrate according to claim 8 comprising polyester fibers.

10. A flexible fabric substrate according to claim 8 comprising polyethylene terephthalate.

11. The method of preparing a flowable composition that imparts a durable water-resistant and water-repellant film to a flexible or rigid substrate which comprises:

(a) partially curing to an acrylic copolymer a copolymerizable mixture of about 1 to 10% by weight of a monoethylenically unsaturated monomer of glycidyl methacrylate and 70% to 99% parts by weight of a lower aliphatic acrylic acid ester;

(b) separately reacting under controlled conditions of acidity between a pH of 5 and 6 a mixture of an alkyl substituted silicone prepolymer having pendent hydroxy functions and a vinylalkoxysilane monomer of the formula $$RSi[OC_2H_4)_nOR^1]_3$$

in which R is a vinyl radical, $R^1$ is methyl or ethyl and n is at least 1 and not more than 7, by adding the silicone prepolymer slowly to the vinylalkoxysilane until the silicone prepolymer is substantially dissolved therein;

(c) adding the silicone prepolymer-vinylalkoxysilane reaction product into the partially polymerized acrylic copolymer to form a flowable coating composition; and wherein said acrylic copolymer comprises about 50 to about 90% by weight of said composition and each of said silicone prepolymer and said vinylalkoxysilane comprise about 2 to about 12% by weight of said composition.

12. A coating composition for imparting a durable water-resistant and water-repellant film to a flexible or rigid substrate prepared by the method which comprises:

(a) partially curing to an acrylic copolymer a copolymerizable mixture of about 1 to 10% by weight of a monoethylenically unsaturated monomer of glycidyl methacrylate and 70% to 99% parts by weight of a lower aliphatic acrylic acid ester;

(b) separately reacting under controlled conditions of acidity between a pH of 5 and 6 a mixture of an alkyl substituted silicone prepolymer having pendent hydroxy functions and a silane monomer of the formula $$R(CH_2)_n-\underset{\underset{X}{|}}{\overset{\overset{X}{|}}{Si}}-X$$

in which R is a member selected from the class consisting of a vinyl radical, epoxy, nitrile, amino and isocyanate, X is lower alkoxy or halogen and n is from 0 to 20 by adding the silicone prepolymer slowly to said silane monomer until the silicone prepolymer is substantially dissolved therein;

(c) adding the silicone prepolymer silane monomer reaction product into the partially polymerized acrylic copolymer to form a flowable coating composition; and wherein said acrylic copolymer comprises about 50 to about 90% by weight of said composition and each of said silicone prepolymer and said silane compound comprise about 2 to about 12% by weight of said composition.

13. A flexible fabric coated with the composition of claim 12.

References Cited

UNITED STATES PATENTS

| | | | |
|---|---|---|---|
| 2,698,314 | 12/1954 | Rust | 260—827 |
| 2,962,471 | 11/1960 | Lang et al. | 260—827 |
| 3,252,825 | 5/1966 | Marzocchi et al. | 260—827 |
| 3,317,629 | 5/1967 | Quaal | 260—827 |
| 3,417,161 | 12/1968 | Douds et al. | 260—827 |

SAMUEL H. BLECH, Primary Examiner

U.S. Cl. X.R.

117—124, 132, 135.5, 138.8, 142, 148, 155, 161; 260—23, 31.2, 33.4, 46.5, 80.72, 86.1, 825